UNITED STATES PATENT OFFICE.

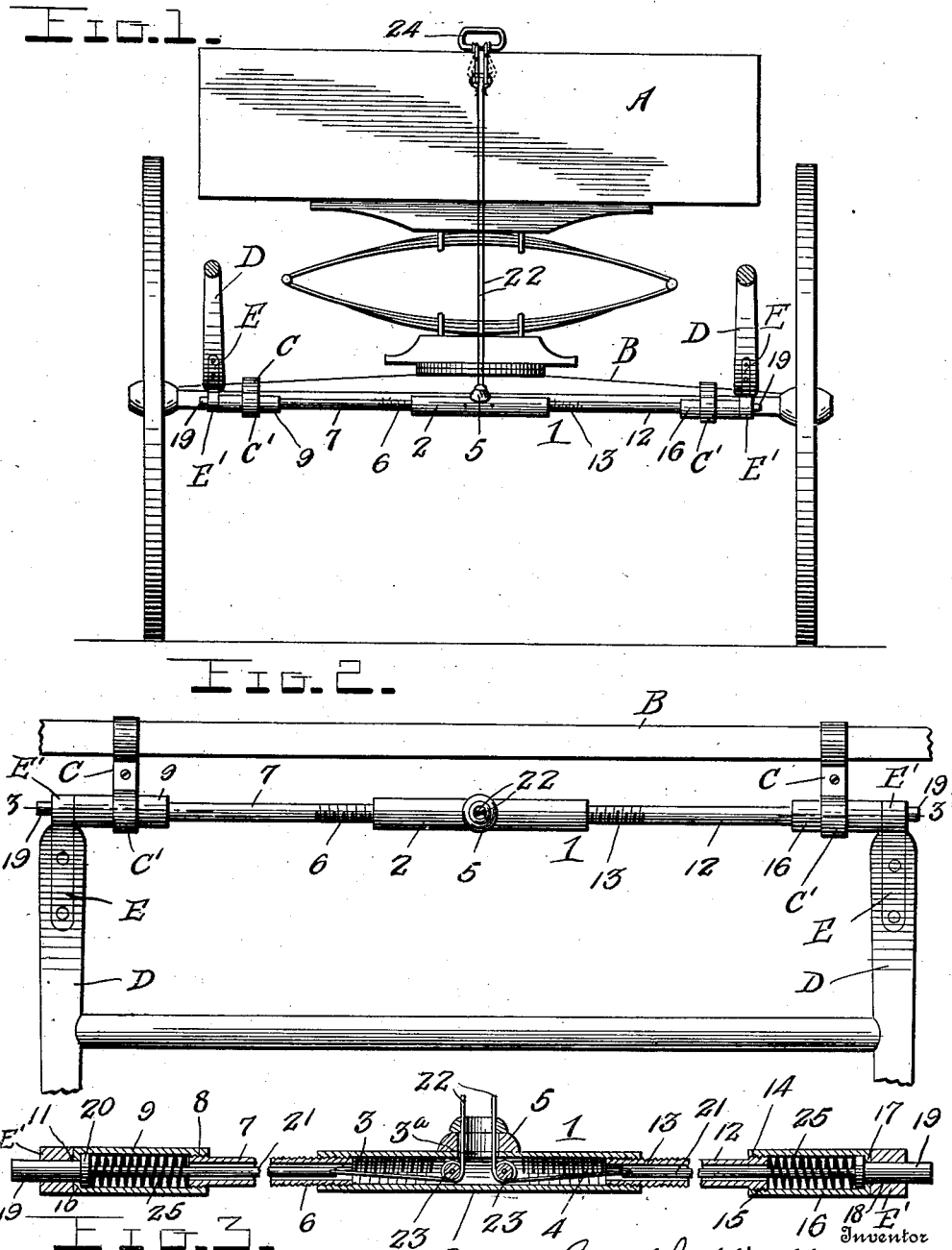

JOSEPH W. HUGHES, OF HOMESTEAD, PENNSYLVANIA.

HORSE-DETACHER.

No. 917,766.  Specification of Letters Patent.  Patented April 13, 1909.

Application filed September 19, 1908. Serial No. 453,760.

*To all whom it may concern:*

Be it known that I, JOSEPH W. HUGHES, a citizen of the United States, residing at Homestead, in the county of Allegheny and State of Pennsylvania, have invented certain new and useful Improvements in Horse-Detachers, of which the following is a specification, reference being had to the accompanying drawings.

My invention relates to an attachment for the front axle of a carriage or vehicle and has for its object a support for the apertured ends of the shaft and means for releasing the shaft in case of a runaway.

A further object is to provide a simple, efficient device of this character which may be easily and quickly attached to or detached from the front axle and which may be adjusted for any size of vehicle shaft.

With these and other objects in view, the invention consists of certain novel features of construction and arrangements of parts as will be described and particularly pointed out in the appended claims.

In the accompanying drawing, Figure 1 is a front end view of a vehicle showing the application of the present invention thereto; Fig. 2 is a top plan view; and Fig. 3 is a sectional view taken on the line 3—3 of Fig. 2.

Referring now more particularly to the drawings there is shown a vehicle A of usual construction, and for convenience, the front axle B is indicated and supports forwardly extending brackets C which may be of any desired form but which are preferably provided with circular or loop shaped outer ends C for a purpose to be hereinafter referred to.

The detacher is indicated at 1 and comprises a hollow tubular member or pipe section 2 having a right hand threaded portion 3 interiorly thereof and a left hand threaded portion 4. The section 2 is provided with a centrally located passage 3ª which is surrounded by a hollow boss 5. The threaded portion 3 of the said section 2 receives the exteriorly threaded portion 6 of a tubular or pipe section 7 which latter is threaded in a similar manner at its outer end as shown at 8 to receive a hollow elongated element 9 having a flanged outer end 10 in which is formed a passage 11 to be hereinafter referred to. A tubular or pipe section 12 is shown, is threaded exteriorly as shown at 13 to engage the threaded portion 4 of the section 2, and at the outer end, the section 12 is threaded at 14 to engage the threaded inner end 15 of a hollow element 16. The element 16 is similar to the element 9 and has a flanged outer end 17 in which is formed a passage 18 disposed in line with the passage 11 as will be apparent upon reference to Fig. 3 of the drawings. Elongated pins or studs 19 work in the passages 11 and 18 respectively and are provided with stop collars 20 slidably mounted in the sections 9 and 16 and normally engage the flanges of the said sections to limit the outward movement of the pins 19. Reduced stems 21 are formed integral with the pins and are slidably mounted in the tubular sections and elements at the ends of the section 2. Each stem 21 has secured thereto in any suitable manner one end of a cable or flexible element 22, and, as will be seen in Fig. 3, each element 22 is engaged beneath a pulley or roller 23 journaled between the walls of the section 2 adjacent to the passage 3ª in order that the said connections may be effectively guided in their movement through said passage and through the hollow boss. The connections 22 are extended upwardly in front of the dashboard of the vehicle A and are attached to an operating lever 24 located in convenient reach of the driver in order that it can be readily operated at the time of an emergency. The thills D of the vehicle carry at their inner ends coupling elements E in which are formed eyes E' to receive the pins or studs 19. To normally hold the pins 19 ejected and engaged through the eyes E', I provide helical or suitable springs 25 housed in the elements 9 and 16 and are arranged to bear at their outer ends against the collars 20.

From the construction shown and described, it is obvious that upon operating the lever 24 to elevate the connections 22 the pins 19 will be retracted or drawn in the elements 9 and 16 to effectively disengage the coupling elements E in order that a ferocious animal may be quickly released from the vehicle.

While the device is particularly used for the purpose set forth it will be understood that the device is also such as to permit ready detachment of the shafts from the vehicle when it is desired to stable or house the latter and to store the same in small space.

By providing the hollow section with the threaded ends 3 and 4 and by providing the sections 7 and 12 with the threaded inner ends as described to engage the said ends 3 and 4 it will be seen that the sections 7 and 12 may be grasped and turned in opposite direction in a manner similar to the well known turnbuckle to shorten or lengthen the device so as to adapt its use to large or small shafts.

The device is extremely simple in construction, and may be formed chiefly from utilized pipe sections to render its being placed upon the market at a minimum figure. While springs 25 are provided for ejecting the pin 19 it is obvious that any elastic or yieldable means may be substituted therefor.

Having thus described my invention what I claim is:

1. A device of the character described comprising a member composed of a plurality of tubular sections telescopically engaged whereby said member may be varied in length, thill engaging rods slidably arranged within the sections of said member, springs for projecting said rods, means for simultaneously retracting said rods, and means for attaching said member to a vehicle.

2. A device of the character described comprising a member composed of a plurality of tubular sections having screw threaded engagement with each other whereby said member may be varied in length, thill engaging rods slidably arranged in the sections of said member, springs for projecting said rods, means for retracting said rods and means for attaching said member to a vehicle.

3. A device of the character described comprising a longitudinally adjustable member having a tubular intermediate section provided with a central opening and with internal screw threads extending from its ends inwardly suitable distances, said member also having two tubular end sections each formed with externally screw threaded ends, the screw threads on one end of each of said end sections being engaged with the internal screw threads at one end of the intermediate section whereby said member may be varied in length, tubular elements having their inner ends engaged with the externally screw threaded outer ends of said end sections of the member, thill engaging rods slidable in said sections of the adjustable member and in said tubular member, coil springs arranged in said tubular members for projecting said rods, guides in the intermediate section of the adjustable member adjacent to its central opening, flexible elements passed through the latter, around said guides, through the tubular sections of the adjustable member and attached to said rods, and clips for attaching said adjustable member to the axle of a vehicle.

In testimony whereof I hereunto affix my signature in the presence of two witnesses.

JOSEPH W. HUGHES.

Witnesses:
   L. O. LITTLE,
   H. F. McQUAY.